United States Patent [19]

Edwards

[11] Patent Number: 5,406,760
[45] Date of Patent: Apr. 18, 1995

[54] MODULAR OFFICE FURNITURE PARTITION

[75] Inventor: John R. Edwards, Nobleton, Canada

[73] Assignee: Hollanding Inc., Newmarket, Canada

[21] Appl. No.: 136,809

[22] Filed: Oct. 15, 1993

[51] Int. Cl.⁶ .............................................. E04B 2/00
[52] U.S. Cl. .................................... 52/239; 52/220.1; 52/220.7; 160/351
[58] Field of Search .............. 160/351; 52/239, 220.1, 52/220.7

[56] References Cited

U.S. PATENT DOCUMENTS

| | | | |
|---|---|---|---|
| 756,749 | 4/1904 | Watts, Jr. .......................... | 52/220.7 |
| 3,745,732 | 7/1973 | Pritchard et al. ................... | 52/239 |
| 4,535,577 | 8/1985 | Tenser et al. . | |
| 4,631,881 | 12/1986 | Charman . | |
| 4,685,255 | 8/1987 | Kelley . | |
| 4,794,744 | 1/1989 | Young et al. ...................... | 52/239 |
| 4,821,477 | 4/1989 | Rydqvist . | |
| 4,881,349 | 11/1989 | Brown et al. . | |
| 4,932,177 | 6/1990 | Hinden . | |
| 4,944,122 | 7/1990 | Wendt . | |
| 5,038,539 | 8/1991 | Kelley et al. . | |
| 5,065,556 | 11/1991 | DeLong et al. .................... | 160/351 |
| 5,065,559 | 11/1991 | Zegel et al. ....................... | 52/239 |
| 5,086,597 | 2/1992 | Kelley et al. . | |
| 5,175,969 | 1/1993 | Knauf et al. . | |
| 5,214,889 | 6/1993 | Hienhuis et al. ................... | 52/239 |
| 5,214,890 | 6/1993 | Levitan et al. . | |
| 5,219,406 | 6/1993 | Raz ................................. | 52/239 |
| 5,241,796 | 9/1993 | Hellwig et al. .................... | 52/239 |
| 5,277,006 | 1/1994 | Ruster ............................. | 52/239 |
| 5,287,666 | 2/1994 | Frascaroli ........................ | 52/239 |
| 5,341,615 | 8/1994 | Hodges et al. .................... | 52/239 |

OTHER PUBLICATIONS

Optima—Finish Brochure, 1992.

Primary Examiner—Carl D. Friedman
Assistant Examiner—Wynn E. Wood
Attorney, Agent, or Firm—Riches, McKenzie & Herbert

[57] ABSTRACT

This invention relates to an upright partition for use in a modular office furniture system, the partition comprising: a frame comprising: two vertical posts each having outward opposing faces defining spaced apart parallel forward and rearward planes; a plurality of horizontal beams, at least one beam in each said plane, each beam having an inward face and an outward face, the inward face of each beam being connected to one said outward face of an associated post in an overlapping moment resisting connection; and a plurality of cladding panels each connected to one said beam; whereby an internal cavity is defined inward of the outward faces of said beams, and a raceway is defined outward of said outward post faces and inward of the outward faces of said beams.

28 Claims, 12 Drawing Sheets

MODULAR OFFICE FURNITURE PARTITION

FIELD OF THE INVENTION

The invention relates to an upright partition, for use in a modular office furniture system, having an open internal frame inward of removable cladding panels within which cables, wires and electrical power conduits may be enclosed.

BACKGROUND OF THE INVENTION

The use of modular office furniture systems is currently very wide spread in modern office interior design. The advantages of using partitions in a modular office system include increased efficiency in the use of space and individual offices with permanent walls may be largely eliminated in open office designs. As a result, a tenant of leased commercial space may minimize the cost of leasehold improvements, and may occupy and vacate premises rapidly through assembly and disassembly of modular components.

Conventionally a partition comprises an interior hollow rectangular frame constructed of roll formed sheet metal channel sections welded together in a rigid assembly. Electrical wiring and communication cables are accomodated in the hollow interior of the partitions, and are passed between partitions through holes punched in the webs of frame members. Partitions are connected together at their vertical end frame members into various geometric office maze patterns and cladding panels are hung on the frames to enclose and conceal the supporting frames and wiring.

Commonly the vertical frame members have a series of longitudinally spaced slots within which dogs extending from the cladding panels are engaged. In a like manner shelves, desktop brackets, filing cabinets and other components of the modular office furniture system are hung on the partitions to complete the modular furniture assembly.

The fabrication of conventional partition frames often involves several operations which require special tooling and machine setups. For example, where frame members are constructed of formed sheet metal channels, openings for wiring, notches for connections to other frame members and slots for hanging accessories are punched in a flat sheet metal blank. The blank is then bent into a channel shape in a rollforming operation, or on a brake press. The formed channels are then fitted together in a jig and welded at rigid connections.

It will be apparent that where different sized frame members are used and where the configuration of members vary, numerous machine setup modifications must be made. Production may involve the preparation of a number of different frame member configurations each of which may require separate inventory, machine setups, production scheduling and drawings. Therefore it is desirable to simplify the design of frame members as much as possible to minimize production costs, inventory requirements, and provide maximum flexibilty in manufacturing scheduling.

It is also desirable to minimize the use of welding as a means for connecting frame components. The heat from welding can distort metal frames, and a further manufacturing step may be required to straighten metal frames which have become twisted, or cambered through the welding process. In addition, welding thin sheet metal frames may require relatively highly skilled workers, and quality control supervision.

A welded metal frame is for all practical purposes, impossible to modify after fabrication. An improperly fabricated welded metal frame must be scrapped and very little of the material can be salvaged for reuse. If a purchaser of a partition system wishes to modify the furniture layout, whole partitions cannot be modified easily. Therefore modification plans are restricted to the rearrangement of existing partitions, or purchasing new partitions of different dimensions.

Despite the above disadvantages however, welded metal partition frames remain the most commonly used type since the strength is high and manufacturing cost is low compared to conventional alternatives.

A significant recent development in partition design relates to the increasing demands being put on office furniture to accomodate various communication devices such as computers, telephones, facsimile machines, printers and the like.

In order to accomodate the increasing number of electrical and communication wires required in most modern office environments, wire or cable raceways through the hollow interior of partitions have been provided. The common conventional location for such a raceway is at the base or cap of a partition.

The individual conventional partitions each have a raceway or several raceways which communicate with each other when assembled in a modular partition wall. The raceway also commonly communicates with the electrical system of the occupied building through vertical power poles which extend up through the drop ceiling of the building office space or through monuments and access openings in the floor of the office space.

U.S. Pat. No. 4,133,153 to Hage describes a typical conventional partition raceway. The base portion of the Hage partition is essentially a hollow accessible beam within which electrical and communication wiring can be placed. The conventional partition frame is connected to the top of the hollow beam forming the cable raceway.

U.S. Pat. No. 5,038,539 to Kelly et al describes another example of a partition system which may accomodate cables at the base and at the cap of a conventional partition system. The vertical frame members are not modified in such a system but rather the cables are passed over the vertical frame members around their outward edges. This type of system may accomodate limited numbers of relatively thin cables retaining them within the space occupied by the cladding panels.

An alternative conventional method of passing wires between frames is described in U.S. Pat. No. 4,535,577 to Tenser et al. In this conventional system openings are made in the web section of vertical frame members. The electrical and communication wiring are threaded through the web openings. Therefore wires are not visible but are entirely concealed by the cladding panels. An advantage of this system is that the outward edges of vertical frame members remain completely clear. Accordingly, the attachment of other components of modular office furniture systems is not impeded by cables overlapping the openings upon which shelves and other components are hung.

A distinct disadvantage of such a system is the need to thread cables through the openings. When installing, moving or maintaining computers or other office equipment, it may become frequently necessary to install and remove the cables. Increased labour costs and wear on the cables results from such a system. However since the web portion of the frame member contributes minimally to the strength of the frame member, providing such openings does not reduce the strength of the frame significantly.

Since most office equipment is operated on the top of a desk or table, current partition designs often include what is known as a "waist-line" waist height cable raceway. Electrical receptacles and various wires are accomodated at waist height thereby eliminating wires which hang down from table top to "base-line" receptacles located at the bottom of a partition. Use of a waist-line raceways simplifies installation and maintenance of equipment by eliminating the need for the installer to crawl under furniture to access a base-line cable raceway and electrical receptacles. The use of a waist height raceway also generally reduces the length of cables required between devices all located at a table top elevation.

An open interior partition system is sold under the trade mark OPTIMA by Design Finish Studio of Israel. This conventional partition is constructed of vertical sheet metal channel posts with pairs of horizontal round tubes. The pairs of horizontal tubes at each of their ends are inserted into specially designed molded plastic end connectors. The plastic connectors are snap-locked into the interior throat of the vertical channel posts to complete a rigid connection. The partition accomodates wires and cables within its interior by threading wires etc between the pairs of tubes and through openings punched in the webs of the vertical post channels.

This type of partition remains at a disadvantage since special molded connectors must be used, and the wires must be threaded between partitions through openings in the web of the posts.

Threading of wires through openings increases the time and effort required to install, remove and maintain office equipment, and increases wear on the outer insulated surfaces of the wiring, thereby reducing its service life.

However in such a conventional partition, since the entire internal space is open, between pairs of horizontal tubes, wires and cables may be accomodated at any level within an individual partition in the interior behind removable panels. Additionally, the panels are coupled to the horizontal beams with resilient tabs, rendering the entire internal cavity easily accessible through removable panels.

Therefore it is desirable to provide a partition which may easily accomodate electrical and communication cables preferably at any height in a manner which simplifies the installation, removal and maintainence of such equipment.

Also it is desirable to protect and conceal wiring and receptacles as much as possible behind cladding panels while maintaining the structural integrity of the partition frame.

The simplification of frame construction may result in significant cost savings in respect of the type of fabrication machinery used in manufacturing, savings in inventory costs, and enhancement of production scheduling.

SUMMARY OF THE INVENTION

The invention addresses the disadvantages of the prior art in a novel manner through the provision of an upright partition for use in a modular office furniture system.

The partition of the invention has a frame which is open within its interior providing clearance for wires and cables enclosed between cladding panels on the frames exterior. The frame is simply constructed of vertical posts and horizontal beams connected together at rigid overlapping joints. Saddle brackets are used to secure rounded tubular beams to square tubular posts with screws or rivets. The overlapping of beams on the posts provides a rigid connection and also defines a wire accomodating raceway between adjacent partitions. The raceway is defined outward of the outward post faces inward of the cladding panels and preferably at least to the beam outer faces.

Therefore, it will be apparent that by simply cutting posts and beams to length, and connecting them with such brackets and screws, a partition frame may be quickly fabricated. Preferably the partitions are assembled in a factory environment and shipped to the customer. If desired however, the partitions may be shipped to the site in compact bundles reducing the bulk and cost of transportation. The partitions then may be assembled and erected at their final location. The ability to disassemble and reassemble the partition frames also aids the purchaser in moving the partitions to new premises and adds flexibility in redesigning their office layout.

Preferably, the beams are paired together at spaced apart elevations with the post located between beams of the pair. Therefore, the wires may pass between paired beams within the interior of the partition and may be passed over the outward surface of the posts between adjacent partitions. The cladding panels are coupled to the beams with resilient clips such that all panels are easily removable to provide access to the interior of the partition. Wires may pass between adjacent partitions over the outward face of the posts and enclosed inward of the panels. The overlapping of the beams spaces the panels away from the posts thereby providing an adequately sized cable raceway bounded by the beams outwardly and at top and bottom, and bounded inwardly by the adjacent post.

Accordingly the invention specifically provides: an upright partition for use in a modular office furniture system, the partition comprising: a frame comprising: two vertical posts each having outward opposing faces defining spaced apart parallel forward and rearward planes; a plurality of horizontal beams, at least one beam in each said plane, each beam having an inward face and an outward face, the inward face of each beam being connected to one said outward face of an associated post in an overlapping moment resisting connection; and a plurality of cladding panels each connected to one said beam; whereby an internal cavity is defined inward of the outward faces of said beams, and a raceway is defined outward of said outward post faces and inward of the outward faces of said beams.

Further aspects of the invention will become apparent upon review of the following detailed description of the preferred embodiment of the invention.

BRIEF DESCRIPTION OF THE DRAWINGS

In order that the invention may be readily understood, a preferred embodiment of the invention will be described by way of example with reference to the accompanying drawings in which.

DETAILED DESCRIPTION OF PREFERRED EMBODIMENTS OF THE INVENTION

Figure 1:
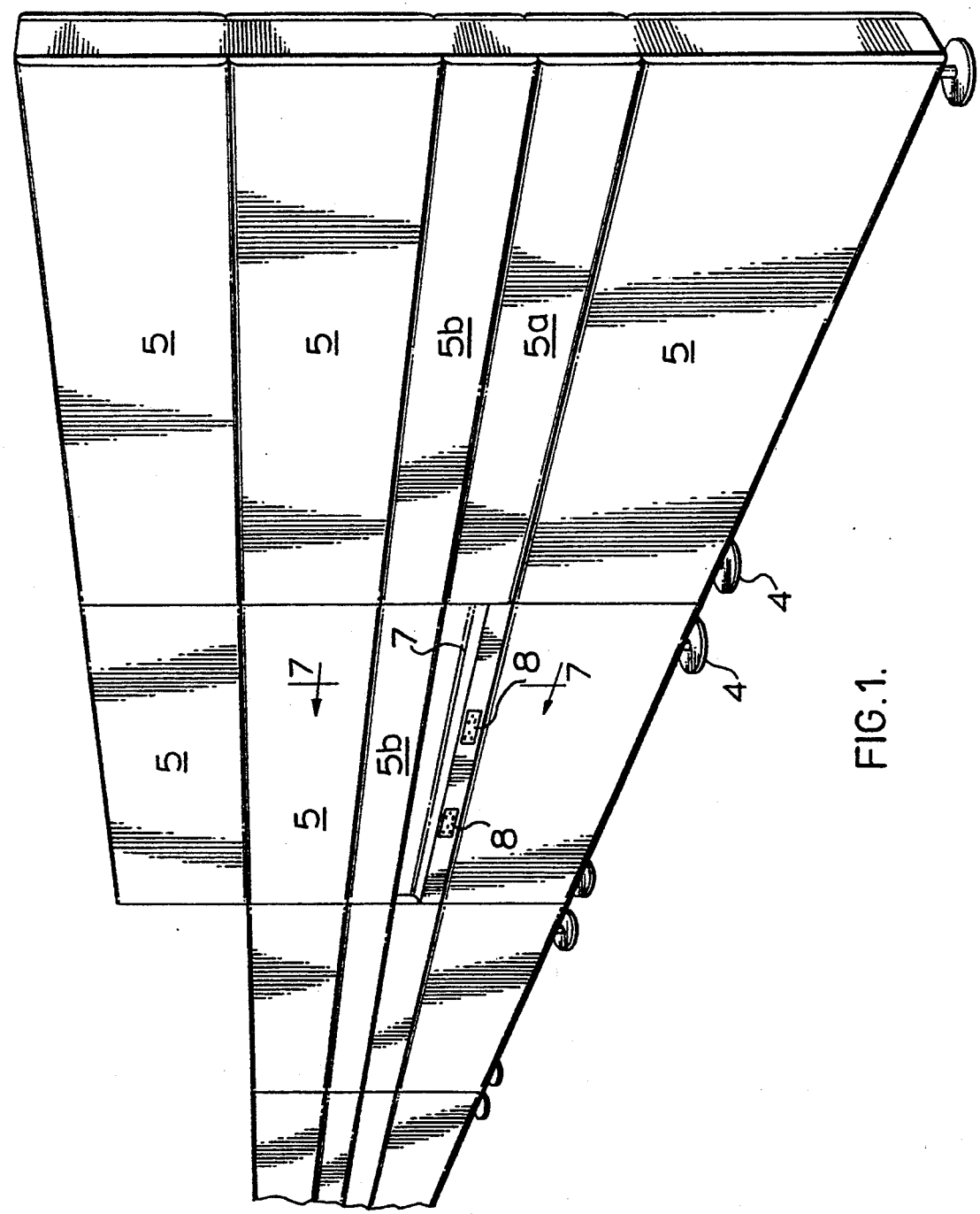
FIG. 1 shows a frontal perspective elevation view of an assembled modular office furniture partition wall including multiple vertical partitions, with a central partition having a modified utility access panel.

Office partition walls are assembled from adjacent rectangular partitions as shown in FIG. 1. A partition is generally clad with panels 5 and 7. The panels 5 and 7 are constructed of a painted sheet metal cover which may be filled with sound absorbing insulation and covered with sound absorbing fabric or other materials. Upper and lower panels 5 may be fitted with windows, or screens if desired. Adjustable legs 4 are provided to level the partition wall along its length.

Figure 2:
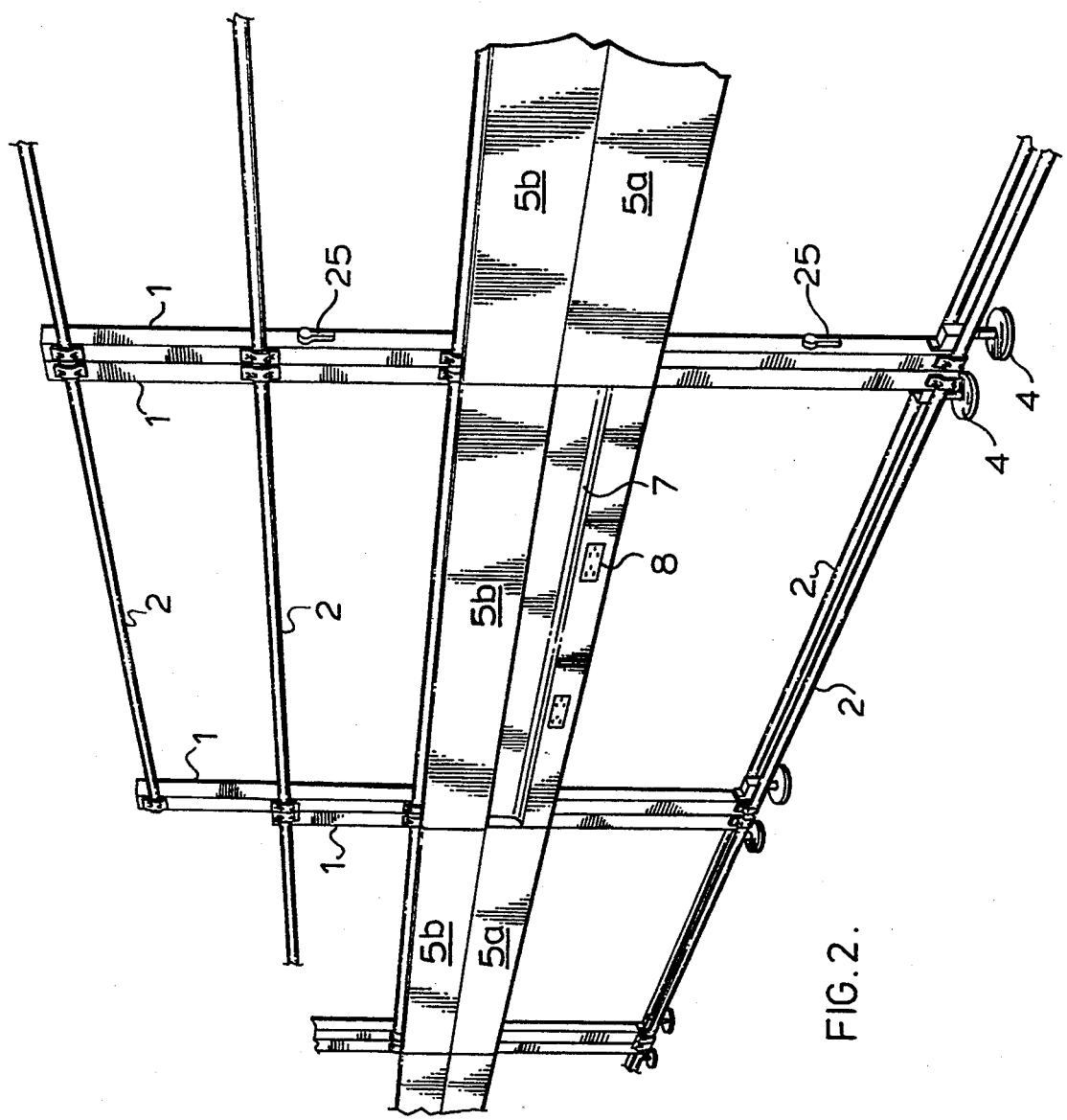
FIG. 2 is a frontal perspective view, of the wall of FIG. 1, with the upper and lower cladding panels removed to reveal the internal partition frame.

The novel construction of the partition frame is illustrated in FIG. 2. Upper and lower panels 5 have been removed leaving only the central panels 5 and 7 behind which electrical conduits, communication wires etc. are housed. Accordingly, upper and lower panels 5 may be wholly eliminated, or in part, from the partition frames if the interior designer wishes to present a more open office atmosphere. Furniture components such as desk tops, shelves, and cabinets can be suspended from the posts 1 of the partition frame independently whether or not a design includes the uppermost and lowermost cladding panels 5.

The frames of the partition are very simply constructed of two vertical posts 1 and horizontal beams 2. The beams 2 are preferrably arranged in parallel pairs on both sides of the posts 1. Pairing of the beams 2 strengthens the frame and allows use of standard panel dimensions.

The beams 2 are connected to outward opposing front and rear faces of each post 1 in an overlapping moment resisting connection.

Figure 10:
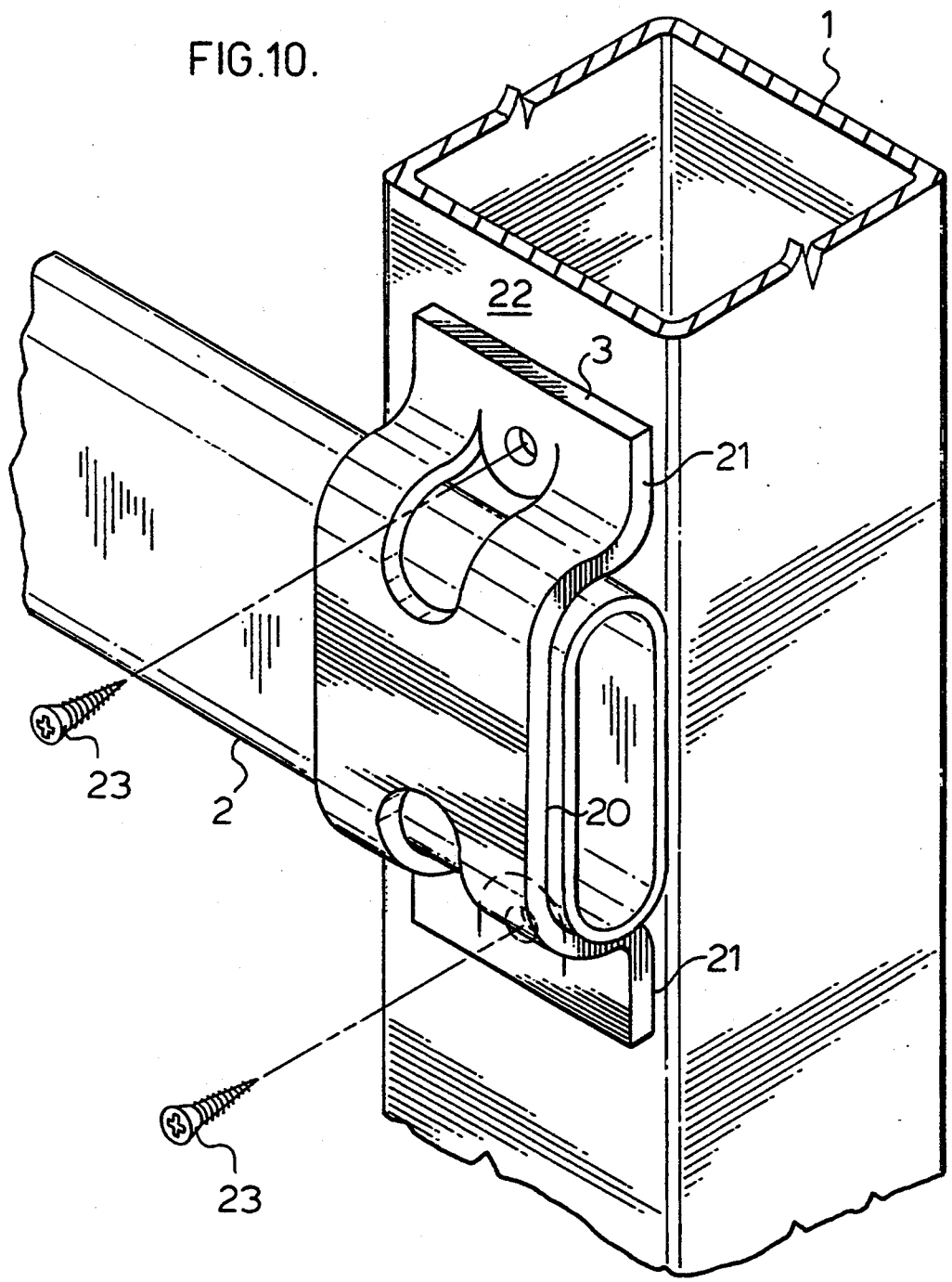
FIG. 10 is an isometric detail view of a typical saddle bracket connection joining a horizontal beam to a vertical post in an overlapping rigid connection.

FIG. 10 shows the preferred means by which the posts 1 and beams 2 are connected in an overlapping rigid manner. The beams 2 are shown as tubular in transverse section having a "racetrack" sectional shape. The tubular beams 2 have an arcuate upper portion and an arcuate lower portion with a straight intermediate portion between. The arcuate upper and lower portions are preferred by semicircular. This section is advantageous in that the section is easily drawn or extruded from metals such as steel and aluminium or from plastic. The section has a relatively high moment of inertia to resist torsion and flexure, and can be easily connected to the posts 1 and panels 5, as shown.

The beams 2 and posts 1 are connected, as shown in the typical connection detail of FIG. 10, with brackets 3 having a saddle portion 20 of internal profile mating the external profile of the beams 2. The brackets 3 also include flange portions 21 above and below the saddle portion 20. The flange portions 21 lie over and are connected to the outward forward or rearward face 22 of the associated posts 1. In the embodiment shown in FIG. 10, the flange portions 21 are perforated and the bracket 3 is connected to the post 1 with self tapping screws 23. Other conventional means may also be used such as rivets, bolts, spot welding or puddle welding (not shown).

The cladding panels 5 include resilient clips (26 and 27 in FIG. 6) for releasably coupling each panel 5 between associated parallel upper and lower pairs of beams 2. In the preferred embodiment illustrated, the cladding panels 5 are positioned outward of, overlying and coupled to the beams 2. Due to the thickness of the saddle portion 20 of the brackets 3 shown in FIG. 10, a gap is present between the beams 2 and the adjacent top or bottom edge of the panels 5.

The partition is formed from an open gridwork of posts 1 and beams 2. As a result, the partition has an open interior cavity which advantageously permits the passage of wires and cables generally indicated as 32.

Figure 6:
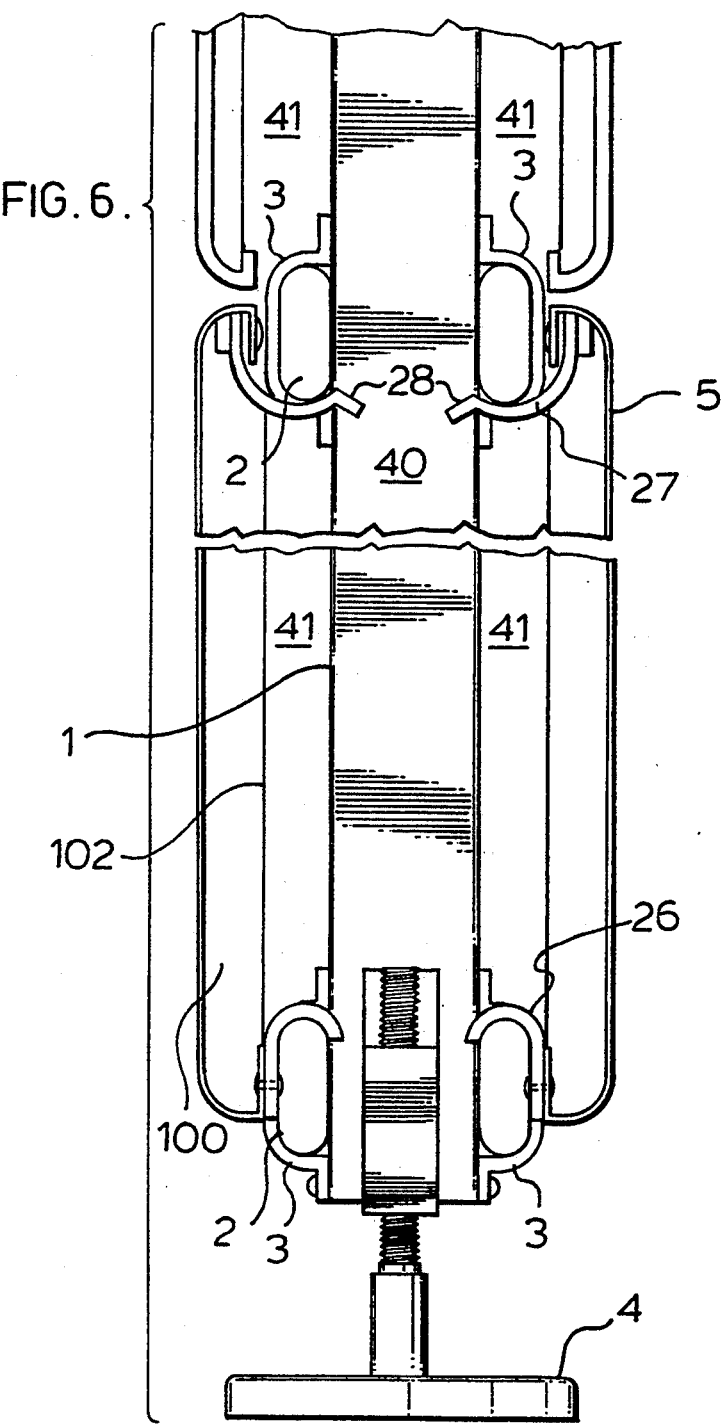
FIG. 6 is a sectional elevation view along line 6—6 of FIG. 5.

As seen in FIG. 6 the cavity is made up of a vertically extending central post space 40 together with horizontally extending raceways 41 adjacent and open to the central post space 40.

The central post space 40 is defined between the posts 1, that is between a forward plane including the forward face of each post 1 and a rearward plane including the rearward face of each post 1. The central post space 40 extends vertically between the spaces, parallel forward and rearward planes and between interior faces of the posts 1. The central post space 40 extends continuously vertically throughout the height of the partition and is open upwardly to above the top of the partition and is open downwardly to below the lowest beam 2 of the partition.

A plurality of raceways 41 extend horizontally between the beams 2 outward of and respective of the forward or rearward planes. The raceways 41 extend the full width of each partition and are open at each end to beyond the exterior end faces of the posts 1.

The raceways 41 are inward of the panels (5 and 7) and preferably extend forwardly and rearwardly from the respective forward or rearward plane at least the thickness of the beams 2.

The raceways 41 are open on their inner sides to the central post space 40 over the entire distance between the posts 1. Whereas the central post space 40 ends at the interior end faces of the posts 1, the raceways 41 provide for a passageway for cables 32 horizontally past the posts 1 outward of the posts 1 inward of the panels 5, 7.

Similarly the central post space 40 provides a passageway for cables 32 vertically past the beams 2 inward of the beams 2 and inward of the panels 5, 7. With the raceways 41 and central post space 40 in communication, the cavity permits cables 32 to be passed vertically through the portion between the posts 1 inside the beams 2 and horizontally across a partition and between adjacent partitions in the raceways outside the posts 1, between the beams 2 and inside the panels 5, 7. In the context of FIG. 2, with a plurality of corresponding panels 5 removed, a continuous raceway 41 will extend along the entire width of the three joined partitions into which cables 32 may easily be laid.

Referring to FIGS. 3 through 9, the details of construction of the partition frame are illustrated. In the embodiment illustrated the posts 1 are hollow structural square steel tubes. The posts 1 include a vertical series slots 24 in their outward forward and rearward faces. The slots 24 are used to adjustably and removably support hanger means for suspending various furniture components upon the posts 1 of each partition.

Figure 3:
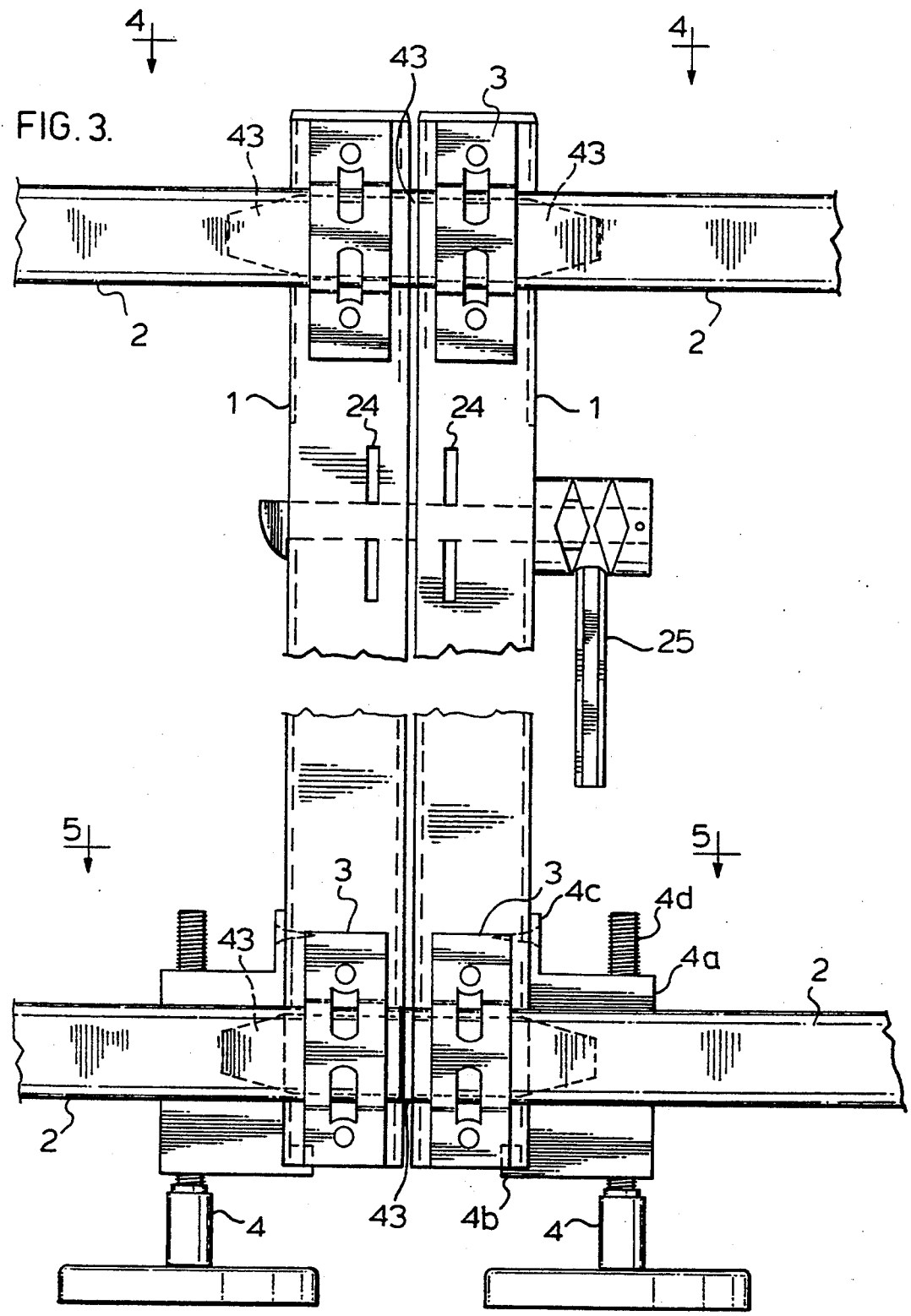
FIG. 3 illustrates an elevation view of adjacent vertical posts, of the wall of FIG. 1, showing two abutting partitions with their supporting feet and horizontal beam frame members.
Figure 4:
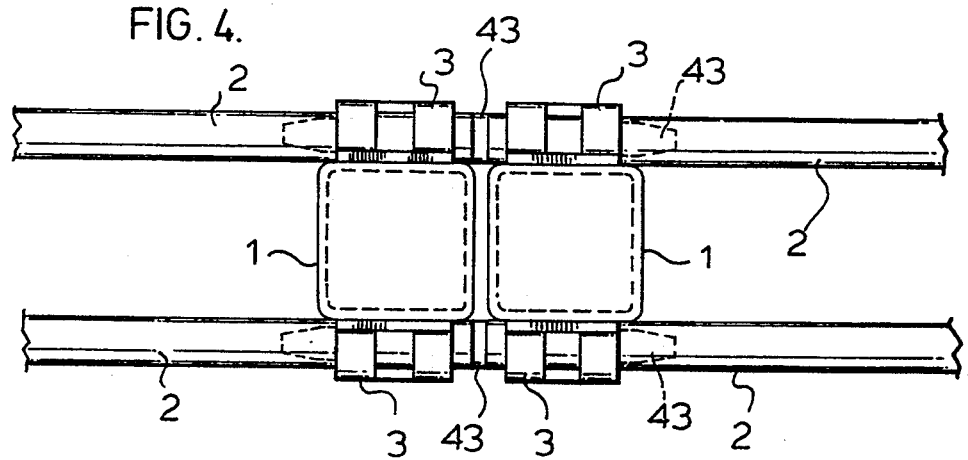
FIGS. 4, and 5 are sectional plan views along lines 4—4 and 5—5 of FIG. 3.

Adjacent posts 1 of adjacent partition frames are connected with releasable securing means in the form of toggle clamps 25 as shown in FIG. 3.

Adjustable height legs 4 are provided at the base of each post 1 to support the partition frame, and level the assembled partition wall on the supporting floor surface.

Preferably the beams 2 are arranged in parallel pairs, with one beam 2 of each pair being connected to the outward opposing faces of each vertical post 1. The pairs of beams 2 are vertically spaced from other pairs of beams 2 at uniform vertical intervals.

The panels 5, as shown in FIG. 6, are releasably coupled between associated parallel upper and lower beams 2 with resilient clips 26 and 27. The lower resilient clip 26 rests upon the upper arcuate curved surface of the lower beam 2. The upper resilient clip 27 has an inward leading lip 28 which guides the upper clip 27 over the lower semicircular rounded surface of the upper beam 2 in order to resiliently engage the upper beam 2.

Figure 9:
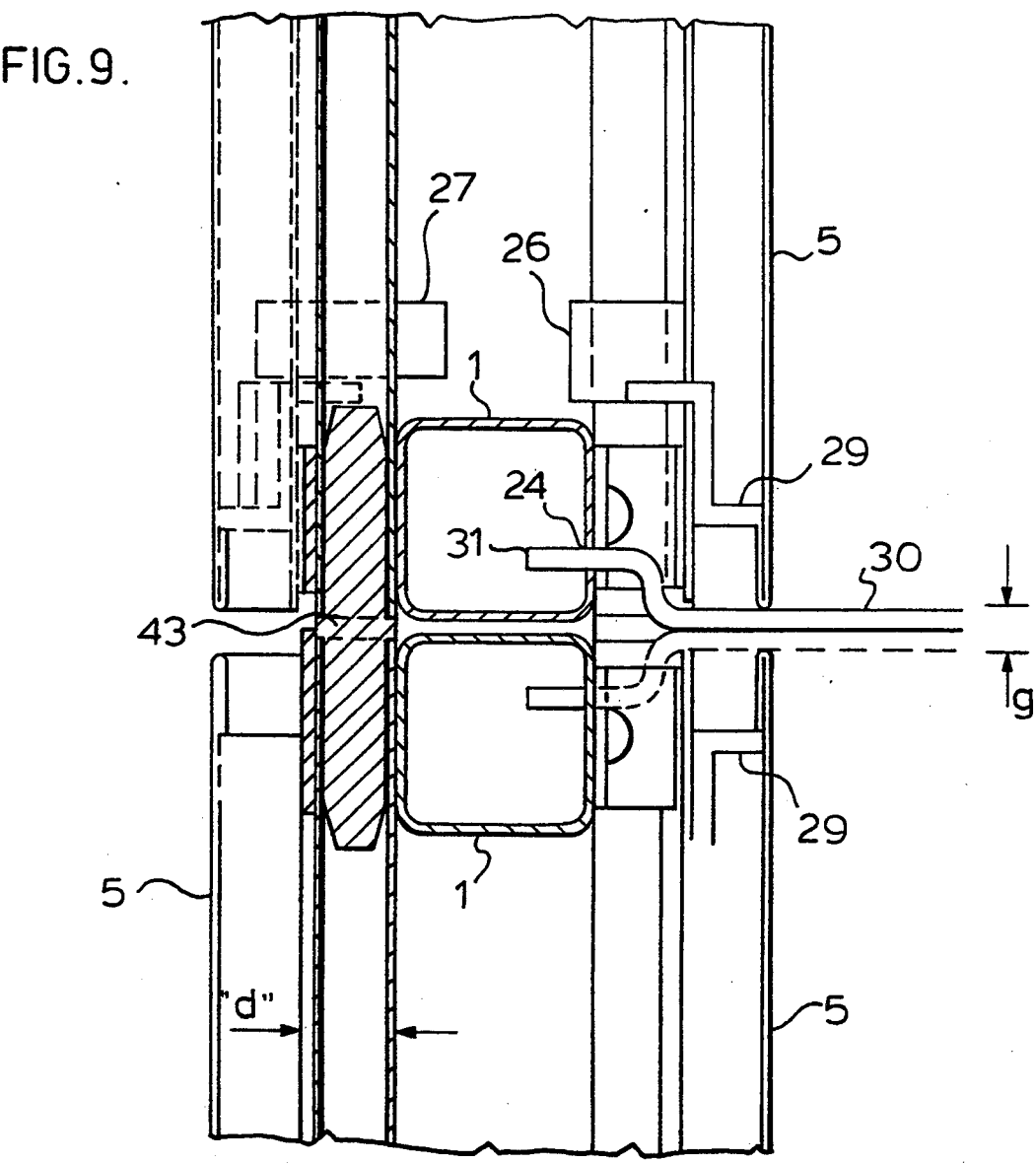
FIG. 9 is a sectional plan view along line 9—9 of FIG. 7.

FIG. 9 shows a sectional view in the plan which illustrates further details of the clips 26 and 27. Advantageously the clips 26, 27 are formed of plastic together with a panel bulkhead 29 which closes and masks both ends of the panel 5.

FIG. 9 shows that between ends of adjacent panels 5 there is a vertical gap of width "g" provided. The gap "g" enables the insertion of the hanger means 30. The hanger 30 has an inward end which has inward facing dogs 31 to co-act with selected slots 24 in the outward face of the posts 1. The inward end of the hanger 30 is bent in an offset S-shape in order that the cladding panels 5 cover over the slots 24 and the inward end of the hanger 30. As a result, the slots 24 and associated offset parts of the hanger 30 are not visible when the panels 5 are installed. The hangers 30 extend outwardly from the posts through gap "g" and may be used in known manner to support furniture components such as desktops, shelves, cabinets and the like.

Figure 7:
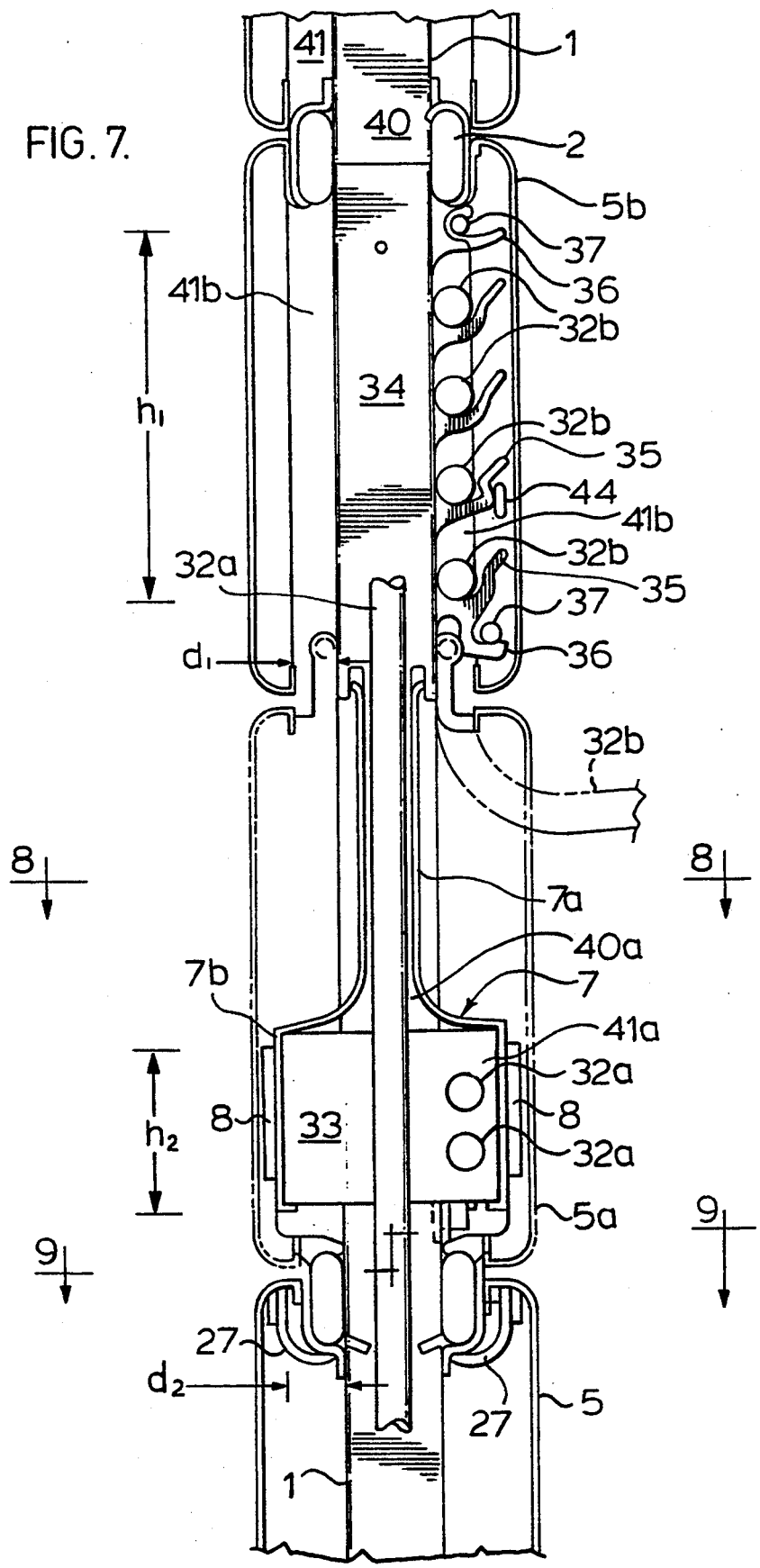
FIG. 7 is a sectional elevation view along line 7—7 of FIG. 1 showing the structure of the utility access panels with electrical power bus, and cable hanger.
Figure 8:
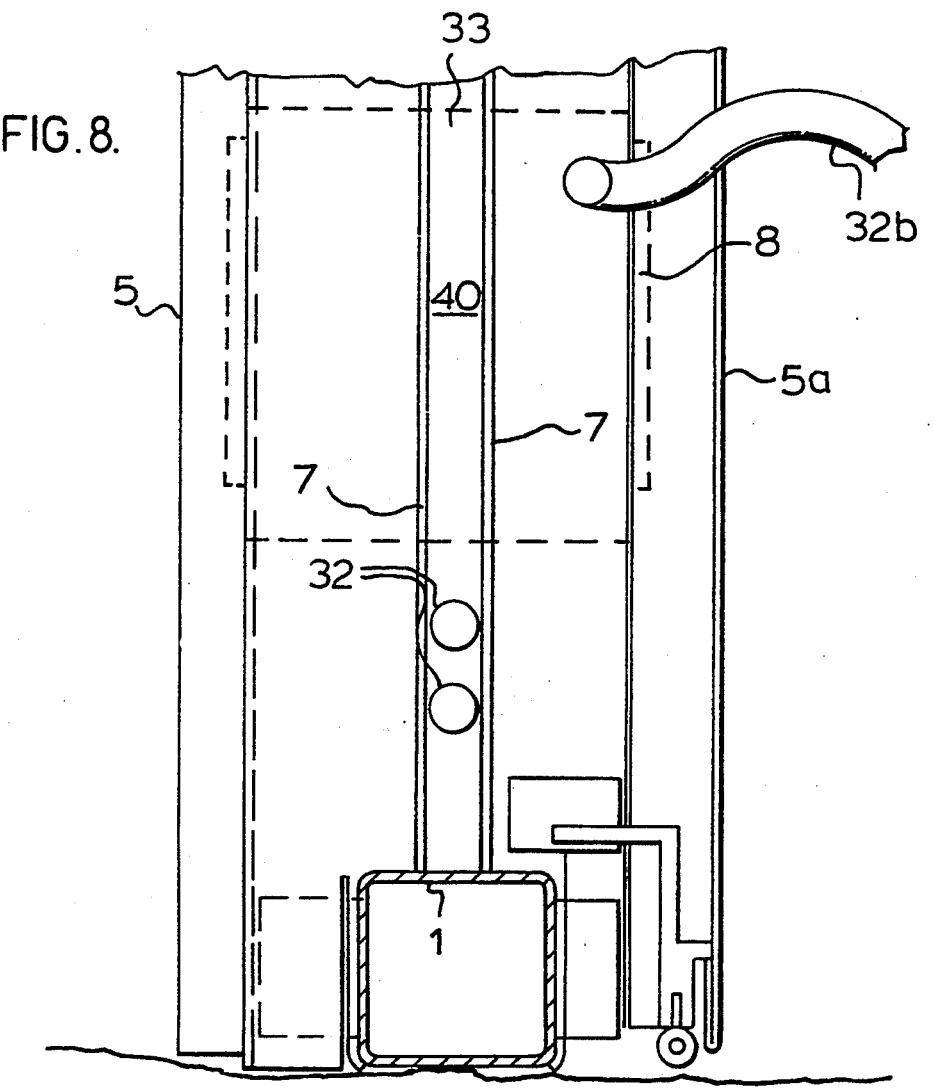
FIG. 8 is a sectional plan view along line 8—8 of FIG. 7.

A particularly. advantageous feature of the partition according to the invention relates to the capacity to accomodate cables and wires 32 in a novel fashion having regard to the interior cavity comprising the central post space 40 and the raceways 41 described earlier. While many different configurations may be adopted to pass cables and wires 32 between partitions and into and out of the interior cavity, one preferred embodiment is illustrated. Referring to FIG. 7, FIG. 7 shows a portion of a raceway indicated and referred to as raceway 41b, underneath an upper panel indicated as 5b, adapted to carry horizontally extending communication wires 32b and another portion of the same raceway indicated and referred to as raceway 41a, underneath recessed panel 7 adapted to carry horizontally extending electrical cables 32a. As shown in FIG. 7, in a preferred embodiment, the intermediate panels 5 may be used to house communication wires 32b for computers and other office equipment. Intermediate panels 5a maybe used to house electrical power outlets 8, an associated electrical power bus 33 and associated electrical power cables 32. Since such wires 32b, cables 32a and power bus 33 are commonly required to be hidden, the embodiment of FIG. 2 shows the intermediate panel 5b and recessed panel 7 remaining installed, whereas the other panels 5 are removed.

In FIG. 7 in dotted outline, an optional cladding panel 5a is shown installed over recessed panel 7. The recessed panel 7 has an upper portion 7a which is inwardly upwardly recessed so as to not extend forwardly beyond the faces of the post 1 in order to provide space for vertical passage of the wires 32b from the raceway 41b to equipment which is external to the partition panels 5. Passing the wire 32b in raceway 41b downward adjacent the upper portion of recessed panel 7 and then out under the panel 5b effectively and simply masks the entry of wires 32b into the partition.

Above the recessed panel 7, wires 32b are accomodated within a cable support tree 34. The cable support tree 34 is attached with screws to an inner end face of an adjacent post 1. The tree 34 comprises a vertical member with vertically spaced apart series of laterally extending cable support arms 35. As drawn, the tree 34 has support arms 35 extending into raceway 41b on the right side only, for clarity. However, it will be understood that arms 35 may advantageously be provided on the left side as well. A modified cable support arm 36 includes an outward extension to engage supporting rods 37 secured to the rear of the removable cladding panel 5b. The removable panel 5b may be removed by pushing the bottom edge inward, which pivots the panel 5 about the boss 44 below the panel centre line to snap the top rod 37 out of engagement with the top modified arm 36. While the cable support trees are shown attached to each post, depending on the width of a panel 5, additional support trees 34 may be provided inserted between the posts 1 supported by the beams 2.

Advantageously, as best illustrated, in FIG. 7 wires 32b pass along the entire width of each partition and between adjacent partitions via horizontal cable raceway 41b. The raceway 41b as illustrated is of depth "$d_1$" is bounded by the outward face of the post 1 and panel 5b, and of height "$h_1$" bounded vertically by the horizontal beams 2 of two vertically spaced apart pairs of beams 2.

The lower portion 7b of the recessed panel 7 covers an electrical bus 33,. Electrical power cables 32a are shown to pass horizontally to buses 33 in adjacent panels via raceway 41a. Raceway 41a is illustrated as having depth "$d_2$" and height "$h_2$". The buses 33 are fixed to the posts 1 or beams 2 and include electrical outlets 8 on each side. To ensure the safety of the installation, the recessed panel 7 is connected to the posts 1 and the bus assembly with screws or other relatively permanent connectors. Accidental access to live electrical components is avoided therefore.

Electrical outlets 8 are accomodated by merely punching holes in the appropriate locations through the lower portion of the recessed panel 7. If access to the electrical bus 33 and electrical outlets 8 is not required, an optional cladding panel 5a (as shown in dotted outline in FIG. 7) may be installed over the recessed panel 7 in order to provide an uninterupted finished appearance. Alternatively, the power bus 33 component may be eliminated entirely from that partition.

The optional cladding panel 5 may be conveniently stored within the cavity of the partition, behind an upper panel 5 for example, if access to the electrical outlets 8 and recessed panel 7 is desired.

The central post space 40 provides vertical passage throughout the entire height of the partitions other than where blocked by the bus 33. FIG. 7 schematically illustrates a length of electrical cable 32a extending to one end of bus 33, past the bus 33 up the central post space 40 from below the lowermost beams 2, to up to the height of the cable tree 34. As illustrated, between the panels 7 the central post space 40 has been narrowed to a vertical duct 40a of depth at least as great as the thickness of cable 32. Panels 7 need not be recessed inside the forward and rearward faces of the posts 1. When electrical power is accessed at floor level, the central post space 40 may be used to pass cables 32a upwardly from a power source in the floor and the bus 33. When electrical power is accessed from ceiling level, conventional power poles may be used which communicate with upper portions of the central post space 40 downwardly to the bus 33.

Electrical cables 32a are preferably armored in metal, and pass across the entire width of a partition and between adjacent partitions through the horizontal raceway 41a. Commercially available modular buses 33 are preferably used having outlets on both sides with pigtail conduits 32a for interconnection in lengthwise series along the length of the assembled partition wall.

Therefore the specific combination of the upper raceway 41b and the lower cable raceway 41a, and central post space 40 of the partition provide convenient means to house cables 32a and wires 32b hidden from view behind removable panels 5b and recessed fixed panel 7. All cables 32a and wires 32b may pass easily between adjacent partitions within the cable raceways 41a or 41b between the vertical posts 1 and exterior cladding panels 5 and 7.

Preferably the intermediate panel 5b which covers the cable supporting tree 34 is positioned immediately above desktop height. The recessed panel 7 is positioned immediately below desktop height. Since the raceways 41a and 41b pass on the outward surface of the posts 1, slots 24 which support hanger brackets 30 cannot be accessed in the immediate area of the raceways 41a or 41b when cables or wires 32 are to be housed within the raceways. However, this feature is not particularly disadvantageous, since in general, hanger brackets 30 are positioned above desktop height for shelves and filing cabinets, whereas hangers 30 are positioned below desktop height to support desks, and filing cabinets.

Therefore hangers 30 in the immediate area above desk top height are not generally required. If a design calls for hangers 30 in that specific location, it is a very simple matter to position the cable tree 34 at a higher or lower panel 5 location. Since the entire internal cavity 40 of the partition is open, wires 32b and cables 32a may be relocated anywhere within the interior cavity 40 of the partition to meet the requirements of a specific design.

Figure 11:
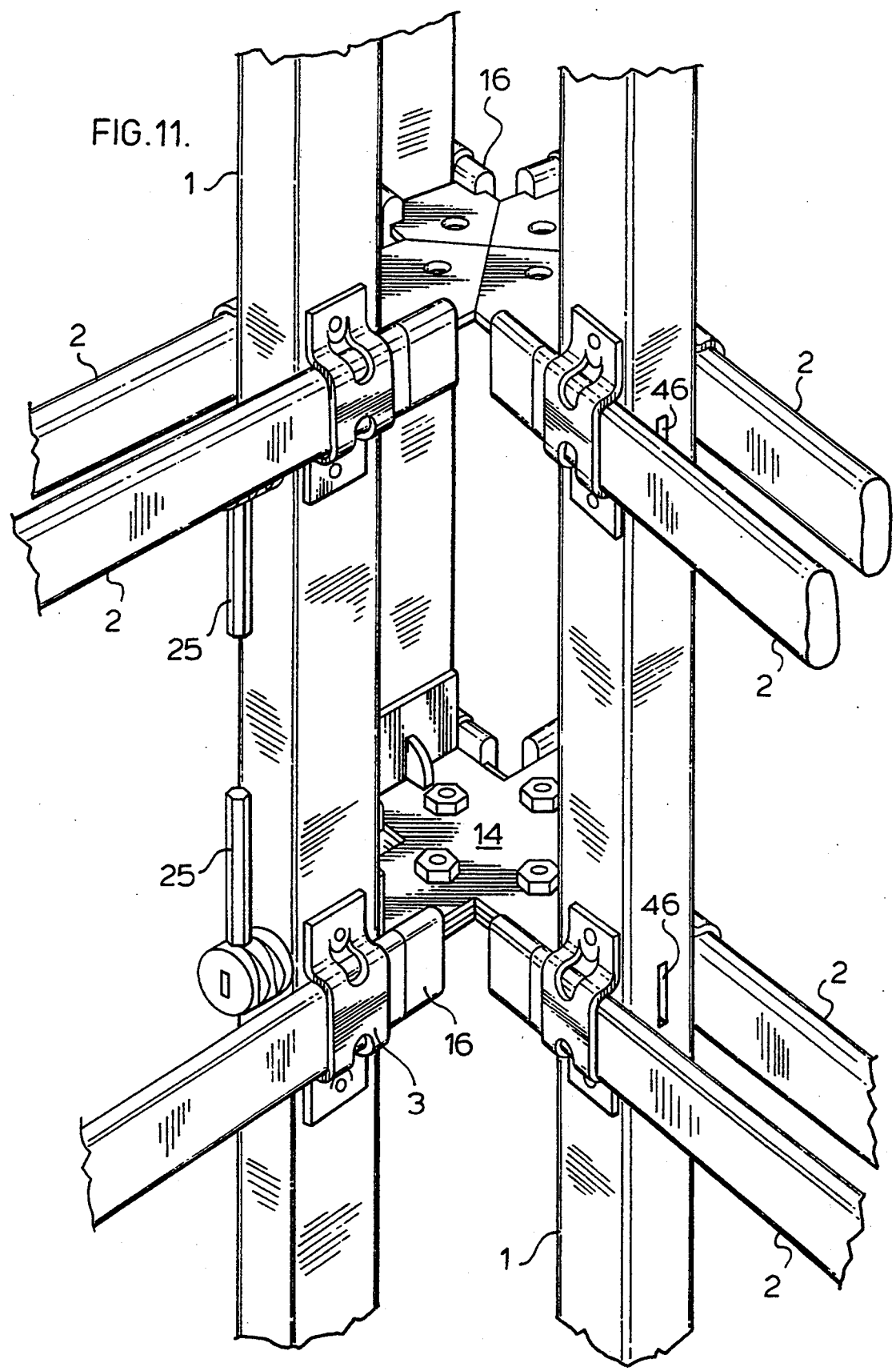
FIG. 11 is a perspective view of the connection between four adjacent partition frame posts in an X-shaped configuration.
Figure 12:
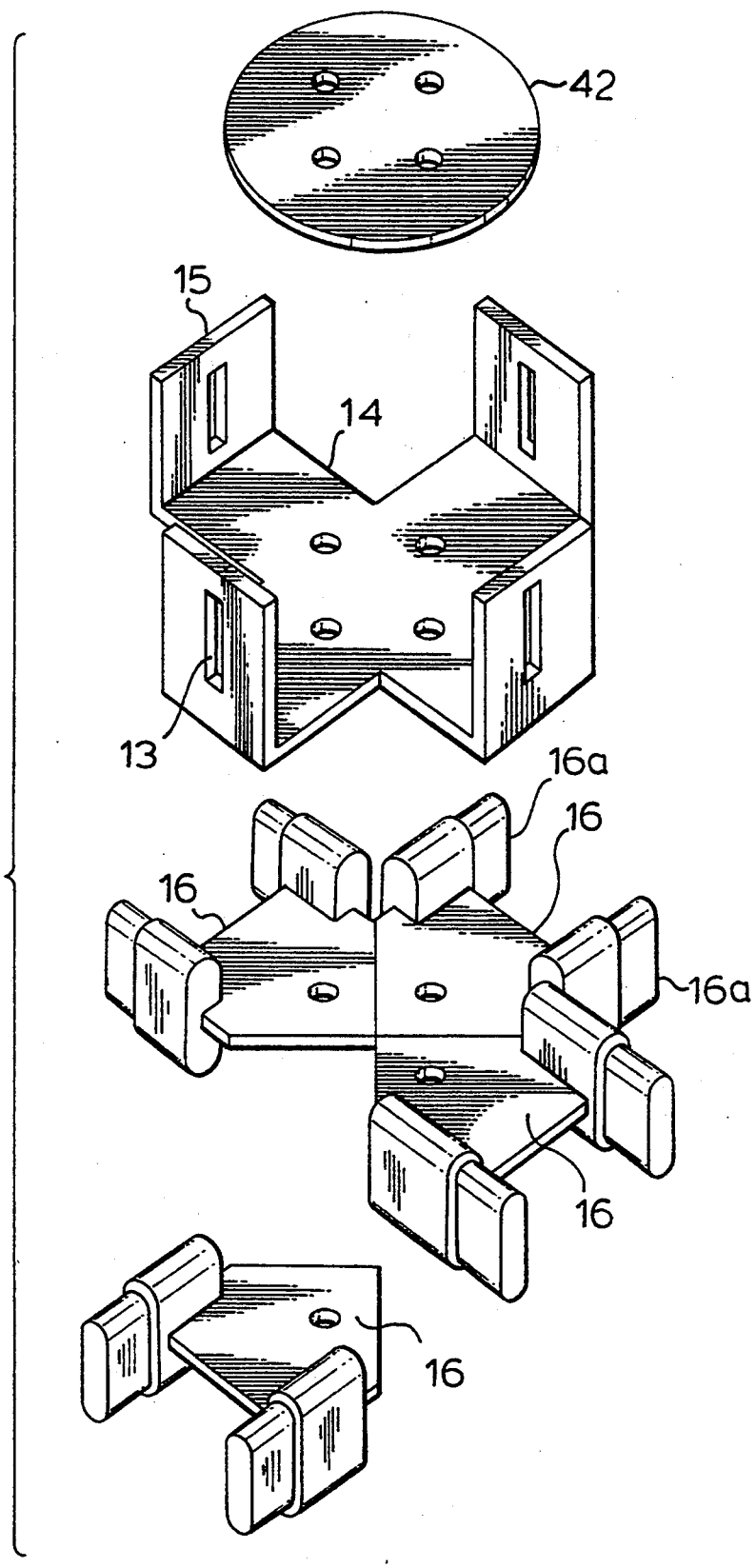
FIG. 12 is an exploded view of the component parts of the connection shown in FIG. 11.

FIGS. 11 and 12 show the details of the connection between four adjacent partitions in an X-shaped pattern. It will be apparent that connections of two or three adjacent panels in L-shaped or T-shaped patterns or between panels in other than 90° orientation can be accomplished in an analogous manner.

The leading hook-shaped ends of the toggle clamps 25 extend through slots in the posts 1 and engage a slotted opening 13 in the X-shaped connector 14. Upturned legs 15 are pressed against the lateral surface of the posts 1 and clamped securely. Further securement of the connection may optionally be provided by bolting arrowhead-shaped connectors 16 to connector 14 with the end inserts 16a of each connectors telescopially received within the interior of the open ends of the associated tubes 2. The arrowhead connectors 16 include mating apertures in order to bolt them to the X-shaped connector 14.

It has been found by experimentation that only one X-shaped connector 14 need be used at the mid-height level to securely connect four adjacent frames. Additional strength may be achieved if necessary in specific circumstances by providing additional X-shaped connectors 14 as shown in FIG. 11. Preferrably though, only one X-shaped connector 14 need be used, and for additional stability and strength arrow-head connectors 16 may be used without connector 14. In this case disks 42 are used as a vehicle to which to secure adjacent arrow-head connectors 16 inserted into the interior of each pair of beams 2 throughout the height of the partition. The use of relatively expensive toggle clamps 25 therefore can be minimized without sacrificing the strength of the connection.

In order to secure abutting partitions together in a straight run, a single toggle clamp 25 may preferably be used. As shown in FIGS. 3 and 9, the pairs of beams 2 at the top and bottom of the abutting partitions may be joined together with inserts 43 which are force fit within the open ends of abutting beams 2 and span across between abutting beams 2.

The individual partitions in accordance with the present invention have been found to have suprisingly great strength and rigidity on an individual basis. When partitions are joined together end to end with inserts 43 received in the open ends of abutting beams 2 the combined partitions have yet increased and surprising strength and structural integrity.

In order to fabricate partitions, and assemble partitions in accordance with the invention, the following method of production is followed.

The posts i and beams 2 are cut to length from mill stock lengths according to the desired finished dimensions of the partition. Elongate slots 24 are cut into each of the two outward faces of each post 1. Elongate slots 46 to accomodate toggle clamps 25 are also cut in the side faces of each post 1. Holes for screws to attach the saddle brackets 3 are drilled in the outward face of each post 1, and holes are drilled in the side faces of each post 1 near their base to receive self-tapping screws which secure the legs 4 in place.

Beams 2 and posts 1 are then electrostatically coated. The painting operation is carried out by painting posts 1 and beams 2 hung side by side in parallel within an electrostatic painting booth. Compared to the painting of a relatively open welded frame, the painting of posts 1 and beams 2 before assembly is more efficient.

In general, it is more efficient to assemble the partitions in a high production factory environment using jigs, workstations, specialized tools, and handling equipment. The assembled frames may then be shipped to a site for erection.

However, an advantage of the partition design is that, if desired, the frames of the partitions may be constructed on site using simple tools and relatively unskilled labour. The posts 1, beams 2, saddle brackets 3, feet 4, panels 5 and 7, and other components may be packaged in cartons or compact bundles for transport to a site.

Two posts 1 are laid down on one outward face parallel to each other. A jig is preferably used in factory assembly to speed up assembly however it will be understood that a jig is not necessary since the predrilled holes for the saddle brackets 3 will ensure proper spacing and alignment of beams 2 and posts 1 when assembled on site. Beams 2 are overlapped upon the outward face of the posts 1. Saddle brackets 3 are positioned over the ends of the beams 2 and are secured in place with self-tapping screws 23 using a power screwdriver. The partially assembled frame is then turned over and the second beam 2 of each parallel pair of beams 2 is secured to the opposite outward face of each post in a like manner.

Figure 5:
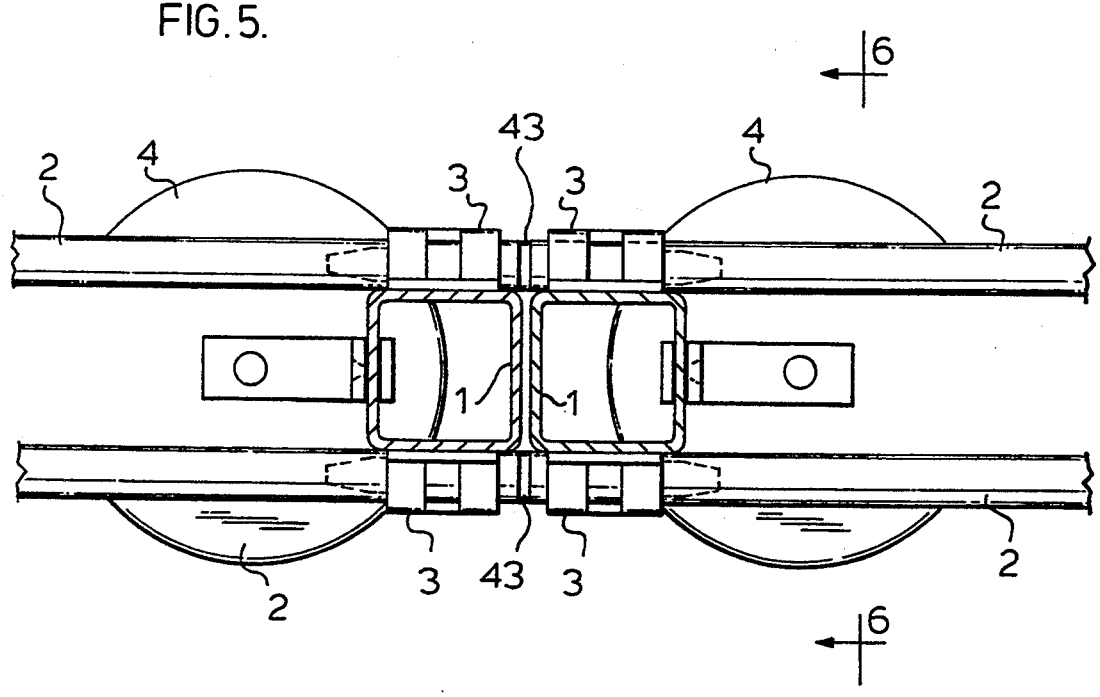

As shown in FIGS. 3 and 5, legs 4 have a cast metal body 4a with a slotted clip 4b upon which the bottom edge of the post 1 is positioned and an upper flange 4c through which self-tapping screws are driven to secure the leg body to the side face of each post 1 base. The cast body also includes a vertical threaded bore to house a threaded shaft 4d. The lower end of the shaft 4d is pivotally connected to a foot base, thereby providing height adjustment to level the partition on uneven floor surfaces.

The assembled frames are erected and connected together in the desired pattern through the use of toggle clamps 25. When X-shaped, T-shaped, L-shaped or other frame connections are desired, as shown in FIGS. 11 and 12, slotted connectors 14 and arrowhead connectors 16 are used to complete a rigid assembly.

Figure 13:
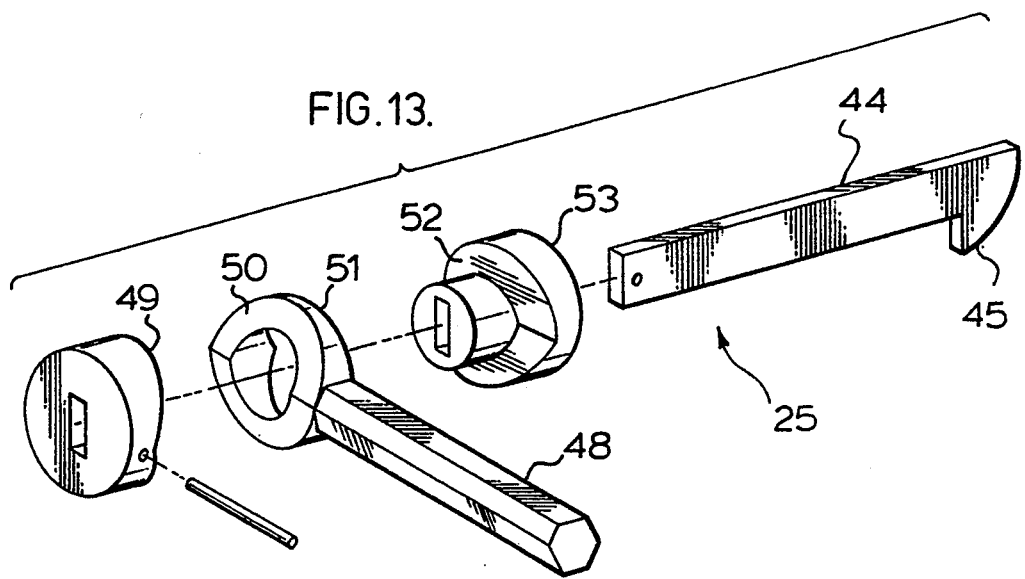
FIG. 13 is an exploded perspective view of the toggle clamp used to connect adjacent frames together.
Figure 14:
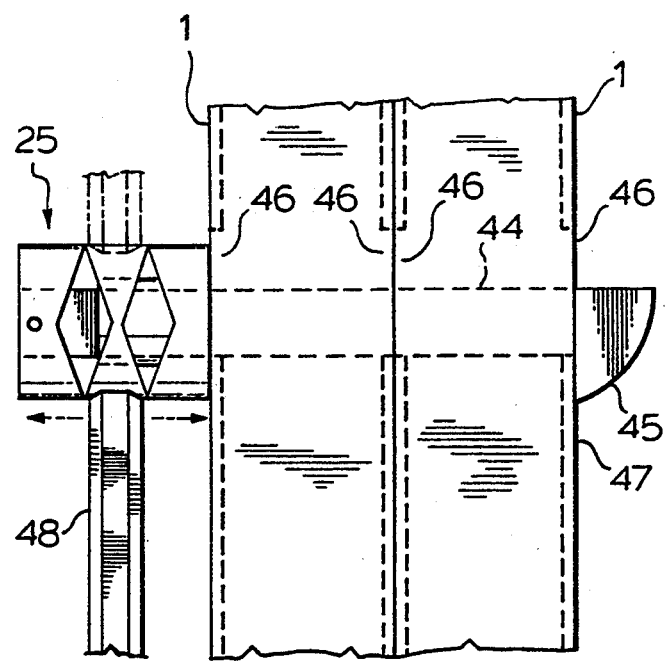
FIG. 14 is a detail elevation view of an installed toggle clamp.

To join posts of two partitions together in a straight run, as best shown in FIG. 14, the arm 44 and hook 45 of the toggle clamp 25 is inserted through aligned elongate slots 46 in the side faces of the posts 1. The hook 45 engages the side face 47 of the second post 1 remote from the remaining body of the clamp 25. From the exploded view of FIG. 13, it will be apparent that when the clamp handle 48 is rotated 90 degrees, the abutting cam faces 49 and 50, and 51 and 52 coact to clamp the posts 1 between the hook 45 and the shoulder face 53.

The cable trees 34 are installed throughout the length of partition wall to be served by office equipment.

Modular electrical buses 33 is installed in the desired locations. Electrical power cables 32a are run from a power source vertically up or down the partition of one interior cavity to one bus 33 location and the horizontally through the raceway 41b across the width of that partition and to adjacent partition. Recessed panels 7 are secured to the cable trees 34 with self-tapping screws.

Furniture components, such as desktops, shelves, filing cabinets etc., are suspended from the posts 1 upon hanger brackets 34 by inserting the dogs 31 of the hangers 34 into the slots 24 of the posts 1. Panels 5 are then resiliently coupled to the beams 2 where desired, covering over the slots 24 and the inward ends of the hangers 30.

Office equipment such as computers, facsimilie machines, telephones, printers, modems, ICU servers etc. are installed within the office space often supported upon the shelves or desktop components. Wires are passed between equipment external to the partition panels 5 and the cable tree 34 housed within the internal cavity 40 of the partition frame.

Wires 32b and cables 32a, are passed between adjacent partitions through the raceway 41b and supported at intervals along the length of the partition wall upon the cable trees 34. The armored electrical power cables 32a are passed through the raceway 41a. When all wires 32a have been installed, the rods 37 of cover panel 5b are engaged upon the modified support arms 36 of the cable trees 34 to enclose the wires 32b within the interior cavity of the partitions.

The partition described above therefore provides a simple construction for a partition. Rigid connections between the posts 1 and beams 3 are readily provided by the simple means attaching brackets 3 at the appropriate levels. The partitions may be substantially fabricated by simply cutting beams 2 and posts 1 to the appropriate length. The partitions may be shipped to the site in knocked-down bundles, and erected on site using simple tools and relatively unskilled labour. The customer may easily disassemble and reassemble the partitions during moving or when rearranging the office layout.

Cables 32a and wires 32b and electrical bus 33 are conveniently housed within the hollow interior cavity of the partition. Wires 32b and electrical power cables 32a are readily accessible behind removable panels 5a and 5b. The need to thread such wires and cables 32 through openings in the posts 1 is eliminated by the provision of two outward raceways 41a and 41b. As a result the installation, removal and maintainance of office equipment is simplified, and wires and cables 32a and 32b are not subjected to the level of wear occasioned through use of conventional partition designs.

Only the intermediate cladding panels 5a and 5b are required in most cases, as shown in FIG. 2, to cover the electrical bus 33 and wires and cables 32a and 32b. The remaining upper and lower panels 5 may optionally not be provided if desired, thereby further reducing the cost of the partition wall. The surface finish and connection detail design may be undertaken to result in an exposed structural "high tech" look which is relatively inexpensive and is currently popular in architectural and interior design.

A very simply constructed partition is provided which meets the increasingly onerous requirements for accomodating the numerous electrical and communication cables 32 of modern office equipment.

In the preferred embodiments, as shown in FIG. 6, the panels 5 have an end cap, indicated as 100, with an inner edge 102 such that raceway 41 is defined between edge 100 and the outer face of the posts 1. The panels5 need not have such end caps 100. Avoidance of the end caps 100 can increase the depth of the raceways 41.

In the preferred illustrated embodiment, the cladding panels 5 have been shown to overlap and be outward of the beams 2. It is to be appreciated that the cladding panels 5 may be provided to not overlap the beams 2 but to be between the beams 2 with the panels 5 being open at their ends and in effect hollow to define the horizontal raceways within the panels 5 between the beams 2.

Although this disclosure has described and illustrated certain preferred embodiments of the invention, it is to be understood that the invention is not restricted to these particular embodiments. For example, the beams 2 and posts 1 may be constructed of any commonly available section, or of specially fabricated sections through extrusion, such as: hollow rectangular tubes, square tubes, round tubes, oval tubes, extruded members, drawn tubes, channel members, I-beam members, and angle members. The panels 5 as well may be constructed having an external cover made of various commonplace materials such as: roll formed sheet metal; extruded aluminium; extruded plastic; fibreboard; and fabric. Therefore, the invention includes all embodiments which are functional or mechanical equivalents of the specific embodiments and features that have been described and illustrated herein.

I claim:

1. An upright partition for use in a modular office furniture system, the partition comprising:
   a frame comprising:
      two vertical posts each having outward opposing faces defining spaced apart parallel forward and rearward planes;
      plurality of horizontal beams, at least one beam in each said plane, each beam having an inward face and an outward face, the inward face of each beam being connected to one said outward face of an associated post in an overlapping moment resisting connection; and a plurality of cladding panels each connected to one said beam;
      each cladding panel having an inner surface;
   whereby an internal cavity is defined inward of the outward faces of said beams, and a raceway is defined outward of said outward faces of the posts and inward of the inner surfaces of the cladding panels.

2. A partition according to claim 1 including pairs of parallel beams, one beam of each pair being connected on each of the outward opposing faces of each vertical post.

3. A partition according to claim 2 wherein said pairs of beams are vertically spaced from other pairs of beams at uniform vertical intervals.

4. A partition according to claim 1 wherein each panel includes resilient clips releasably coupling each panel to at least one said beam.

5. A partition according to claim 4 wherein each panel is coupled by said resilient clips between an upper beam and an associated parallel lower beam.

6. A partition according to claim 5 wherein each panel is coupled outward of and overlying said upper and lower beams.

7. A partition according to claim 1 wherein the beams are selected from the group consisting of: hollow rectangular tubes, square tubes, round tubes, oval tubes, extruded members, drawn tubes, channel members, I-beam members, and angle members.

8. A partition according to claim 7 wherein the beams are drawn tubes which in transverse section have an arcuate upper portion and an arcuate lower portion with straight intermediate portions therebetween.

9. A partition according to claim 8, wherein the beams and posts are connected with brackets having a saddle portion of internal profile mating the external section profile of the beams.

10. A partition according to claim 9 wherein the brackets include opposing flange portions above and below the saddle portion, the flange portions overlying and connected to the outward face of an associated post.

11. A partition according to claim 10 wherein the flange portions are perforated and the bracket is connected to the post with fasteners selected from the group consisting of self tapping screws, rivets, bolts, and puddle weld metal.

12. A partition. according to claim 1 wherein the posts are selected from the group consisting of: hollow rectangular tubes; square tubes; round tubes; oval tubes; extruded members; drawn tubes; channel members; I-beam members; and angle members.

13. A partition according to claim 1 including releasable securing means on at least one said post for securing said post to frames of like partitions in a modular assembly.

14. A partition according to claim 1 wherein the posts include a vertical series of slots in each of their outward faces, the partition further comprising a plurality of hanger means for suspending furniture components upon the posts, the hanger means including an inward end having inward facing dogs co-acting with selected slots of said series, and wherein the cladding panels overly the slots, and said inward. end of the hanger means.

15. A partition according to claim 1 wherein the panels have an external cover constructed of materials selected from the group consisting of: roll formed sheet metal; extruded aluminium; extruded plastic; fibreboard; and fabric.

16. A partition according to claim 1 including an inwardly upwardly recessed panel whereby cables may pass between the internal cavity of the frame and equipment external to the partition panels.

17. A partition according to claim 15 wherein said recessed panel includes electrical power outlets in an outward surface thereof.

18. A partition according to claim 1, including cable support means comprising a vertical member and a vertically spaced apart series of laterally extending cable supporting arms, said cable support means being attached to the posts within the internal cavity of the partition.

19. An upright partition for use in a modular office furniture system, the partition comprising:
   a frame comprising:
      two vertical posts each having outward opposing faces defining spaced apart parallel foward and rearward planes;
      a plurality of horizontal beams, at least two beams in each said plane, each beam having an inward face and an outward face, the inward face of each beam being connected to one said outward face of an associated post in an overlapping moment resisting connection; and a plurality of cladding panels each connected to one said beam;
   whereby an internal cavity is defined comprising:
      (a) a central vertically extending post space between said forward and rearward planes and bounded by said posts, and
      (b) a plurality of horizontally extending raceways bounded by adjacent beams outward from said forward and rearward planes at least as far as said outward faces of the beams, the central post space and raceways in communication between the beams and posts, the central post space permitting passage of cable means vertically and horizontally between the posts inwardly past the beams throughout the entire height of the partition, the raceways permitting passage of the cable means horizontally between the beams outwardly past the posts throughout the entire width of the partition, and to adjacent similar portions.

20. A partition according to claim 20 wherein the central post space is open at a top and bottom of the partition for ingress and exit of cable means vertically therefrom.

21. A partion according to claim 20 wherein the cladding panels define an outward extent of the raceways.

22. A partition as claimed in claim 20 wherein the beams comprise hollow tubes having open ends, each beam extends across each post to present an open end of the beam proximate each end of the partition, coupling means to join ends of partitions having similarly spaced beams together in line including coupling inserts having two ends with each end received telescopically with the open end of a beam of two abutting partitions.

23. An upright partition for use in a modular office furniture system, the partition comprising;

a frame comprising:

two vertical posts each having outward opposing faces defining spaced apart parallel forward and rearward planes;

a plurality of horizontal beams, at least one beam in each said plane, each beam having an inward face and an outward face, the inward face of each beam being connected to one said outward face of an associated post in an overlapping moment resisting connection; and a plurality of cladding panels each connected to one said beam;

whereby an internal cavity is defined inward of the outward faces of said beams, and a raceway is defined outward of said outward faces of the posts and inward of a plane in which the outward faces of the beams lie.

24. A partition according to claim 23 including pairs of parallel beams, one beam of each pair being connected on each of the outward opposing faces of each vertical post.

25. A partition according to claim 24 wherein said pairs of beams are vertically spaced from other pairs of beams at uniform vertical intervals.

26. A partition according to claim 25 wherein the beams are selected from the group consisting of: hollow rectangular tubes, square tubes, round tubes, oval tubes, extruded members, drawn tubes, channel members, I-beam members, and angle members.

27. A partition according to claim 26 wherein the beams are drawn tubes which in transverse section have an arcuate upper portion and an arcuate lower portion with straight intermediate portions therebetween.

28. A partition according to claim 27, wherein the beams and posts are connected with brackets having a saddle portion of internal profile mating the external section profile of the beams.

* * * * *